H. R. Robbins.
Pipe Coupling.
No. 99,003. Patented Jan. 18, 1870.
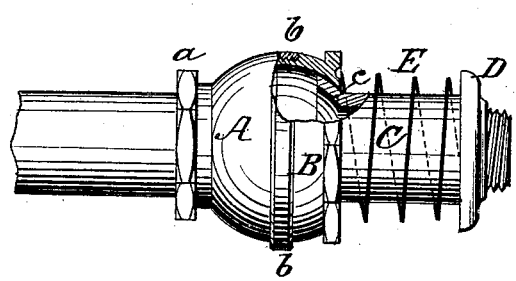
Witnesses.
C. A. Pettit.
J. C. Kenow.
Inventor.
H. R. Robbins
by Munn & Co
Attys.

United States Patent Office.

HENRY R. ROBBINS, OF BALTIMORE, MARYLAND.

Letters Patent No. 99,003, dated January 18, 1870; antedated January 8, 1870.

IMPROVEMENT IN PIPE-COUPLING FOR HEATING CARS.

The Schedule referred to in these Letters Patent and making part of the same.

*To all whom it may concern:*

Be it known that I, HENRY R. ROBBINS, of the city and county of Baltimore, and State of Maryland, have invented a new and improved Pipe-Coupling for Heating Cars, &c.; and I do hereby declare that the following is a full, clear, and exact description of the construction and operation of the same, reference being had to the accompanying drawings, making a part of this specification, in which—

My invention is represented by a side view, a portion of the shell or outer wall having been broken away.

The object of this invention is so to improve the construction of the ball-and-socket joint, employed in connecting the pipes of one car to those of another, that with such joint the pipes can be easily connected or separated, when necessary, while the coupling shall be steam-tight, and shall readily yield to the motion of the cars.

My improved coupling is composed of five parts, which, in the drawings above referred to, are designated, respectively, by the letters A, B, C, D, and E.

A is the larger hemisphere of the globe, having a collar, $a$, into which the steam or hot-air pipe from one of the cars screws.

B is the smaller hemisphere of the globe, screwing into the part A, at $b$.

C is a short section of pipe, having at one end a flange, $c$, in form the segment of a sphere, and fitting within the globe A B, against the mouth of the part B, as shown in the drawing, it being concentric with the interior cavity of the globe.

D is a collar, screwing upon the outer end of the pipe C.

E is a spiral spring, placed around the part C, and pressing against the parts B and D, its object being to hold the flange $c$ tightly against the interior wall of the part B, so as to prevent the escape of the steam or hot air therefrom, while allowing the joint to yield under great pressure.

The pipe from the other car screws upon the end of the part C, outside of the collar D.

To separate the cars, the part B need only be unscrewed from A, and as it turns independently of both A and C, this can readily be done. All the parts of the joint can be easily separated, by unscrewing the parts A, B, and D, detaching the spring, and removing the pipe C from the part B.

This joint is thus exceedingly convenient for use, and, as will be seen from the foregoing description, will form a steam-tight, but elastic and yielding connection between the pipes of the several cars.

The joint can, of course, be used for other purposes to great advantage; but as I design to employ it chiefly for the purpose specified, it is not necessary to describe its application to other uses.

Having thus described my invention,

What I claim as new, and desire to secure by Letters Patent, is—

A ball-and-socket joint, constructed as herein described, that is to say, having the parts A and B, screwing together at $b$, the part C, connected to the part B by the flange $c$, the part D, screwing upon the outer end of C, and the spring, E, surrounding the part C, between the parts B and D, substantially as set forth.

To the above specification of my invention, I have signed my hand, this 3d day of April, 1869.

HENRY R. ROBBINS.

Witnesses:
CHAS. A. PETTIT.
SOLON C. KEMON.